United States Patent [19]

Au

[11] Patent Number: 5,829,004
[45] Date of Patent: Oct. 27, 1998

[54] DEVICE FOR STORAGE AND RETRIEVAL OF COMPACT CONTIGUOUS TREE INDEX RECORDS

[76] Inventor: Lawrence Au, 1321 N. Rolfe St., Arlington, Va. 22209-3007

[21] Appl. No.: 650,945

[22] Filed: May 20, 1996

[51] Int. Cl.$^6$ ........................................................ G06F 7/00
[52] U.S. Cl. .................. 707/100; 707/2; 707/3; 707/101; 711/117; 711/173
[58] Field of Search .................. 707/3, 2, 100, 707/101; 711/117, 173

[56] References Cited

U.S. PATENT DOCUMENTS

| | | | |
|---|---|---|---|
| 4,774,657 | 9/1988 | Anderson et al. | 364/200 |
| 4,914,569 | 4/1990 | Levine et al. | 364/200 |
| 5,355,473 | 10/1994 | Au | 395/600 |

OTHER PUBLICATIONS

Donald Knuth, *The Art Of Computer Programming: "Sorting and Searching"*, ©1973, pp. 481–505.

Aho et. al, *Data Structures and Algorithms*, ©1983, pp. 163–169.

Kruse, *Data Structure and Programming Design*, ©1984, pp. 377–382.

Robert Sedgewick, *Algorithms*, ©1983, pp. 213–223.

*Primary Examiner*—Thomas G. Black
*Assistant Examiner*—Jean R. Homere

[57] ABSTRACT

A system and methods for allocating and traversing tree structured data in contiguous portions of memory by encapsulating lower level subtrees within the memory allocated for their higher level parent trees. These encapsulated memory allocations are encoded with length descriptors at both lowest and highest ends in memory, so that allocated subtrees can be retrieved or skipped when scanning allocated subtrees in either lowest-to-highest or highest-to-lowest directions in memory. The length descriptors themselves are allocated variable amounts of memory by allocating additional multiplier bits to describe larger lengths. Smaller lengths can be described with a smaller number of bits. There is no limit to the size of length which can be described. Extra reserve memory may be allocated within some subtrees to localize the allocation of memory within those subtrees.

18 Claims, 9 Drawing Sheets

Example Of Tree "A":

Fig. 1

Representation Of Tree "A" Using Parenthesis (Prior Art):

Bytes Of Memory Usage:

Parenthesis: 8
Path Bytes: 21

Total: 29

Method Of Acquiring Address Of Head Path Cell:

Fig. 5

Method Of Acquiring Address Of Top Cell Wall:

Method Of Acquiring Address Of Next Higher Sibling:

Fig. 9

Example Of Tree "B":

Fig. 12

DEVICE FOR STORAGE AND RETRIEVAL OF COMPACT CONTIGUOUS TREE INDEX RECORDS

BACKGROUND OF THE INVENTION

This invention relates to improvements in storage, access and maintenance of data for the general form of TRIE tree indexed records. TRIE tree indexes are described in Knuth: The Art of Computer Programming, "Searching and Sorting" (pp. 481–505), in Aho, Hopcroft, and Ullman: Data Structures and Algorithms (pp. 163–169) (1983), in Kruse: Data Structures and Program Design (pp. 377–382) (1984), and as radix search trees in Sedgewick: Algorithms (pp. 213–223)(1983).

The use of such a tree for multi-user database systems with enhancements to concurrent access features is described in the U.S. Pat. No. 4,914,569 to Levine and Mohan describing a means to traverse a BTree or TRIE tree in an orderly fashion while checking and updating the multi-user access status on a node-by-node basis.

A design to improve query access to records indexed by TRIE trees is described in U.S. Pat. No. 4,774,657 to Anderson et al. describing a means to reduce the number of pages accessed to count the subtrees leafs corresponding to a given query.

A method to quickly return the number of subtree leafs in a subtree is described in U.S. Pat. No. 5,355,473 to Au describing a means of encoding subtree leaf totals in each subtree of the tree hierarchy.

None of these improvements of the TRIE tree directly address memory conservation and de-fragmentation issues, both of which significantly affect storage and retrieval performance. Excessive memory usage and memory fragmentation also has the undesirable effect of consuming hardware resources whose cost is significant.

SUMMARY OF THE INVENTION

It is an object of the invention to reduce the memory consumption incurred by storing TRIE indexed records, relative to the prior art which utilizes doubly-directed pointers to individually allocated memory blocks. It is a further object of the invention to store logically adjacent TRIE subtrees in physically adjacent memory, so that memory fragmentation is minimized when storing and retrieving TRIE subtrees.

DESCRIPTION OF THE PREFERRED EMBODIMENTS

Figure 1:
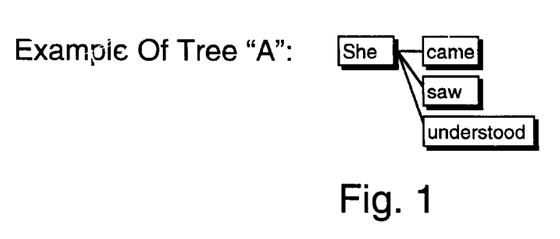
FIG. 1 is an example of a TRIE tree "A" which will be represented in a variety of methods in subsequent figures.

In FIG. 1, a small TRIE tree "A" is shown consisting of four nodes: a root node containing "She ", and three leaf nodes in alphabetical order containing "came", "saw" and "understood". Although small in size, such trees consume a very large percentage of the space in a most TRIE tree systems, since the accurate representation of real-world data tends to put most information into leaf nodes and small subtrees. Consequently the efficiency with which small trees such as tree "A" can be stored and retrieved becomes important to TRIE tree systems.

Figure 2:
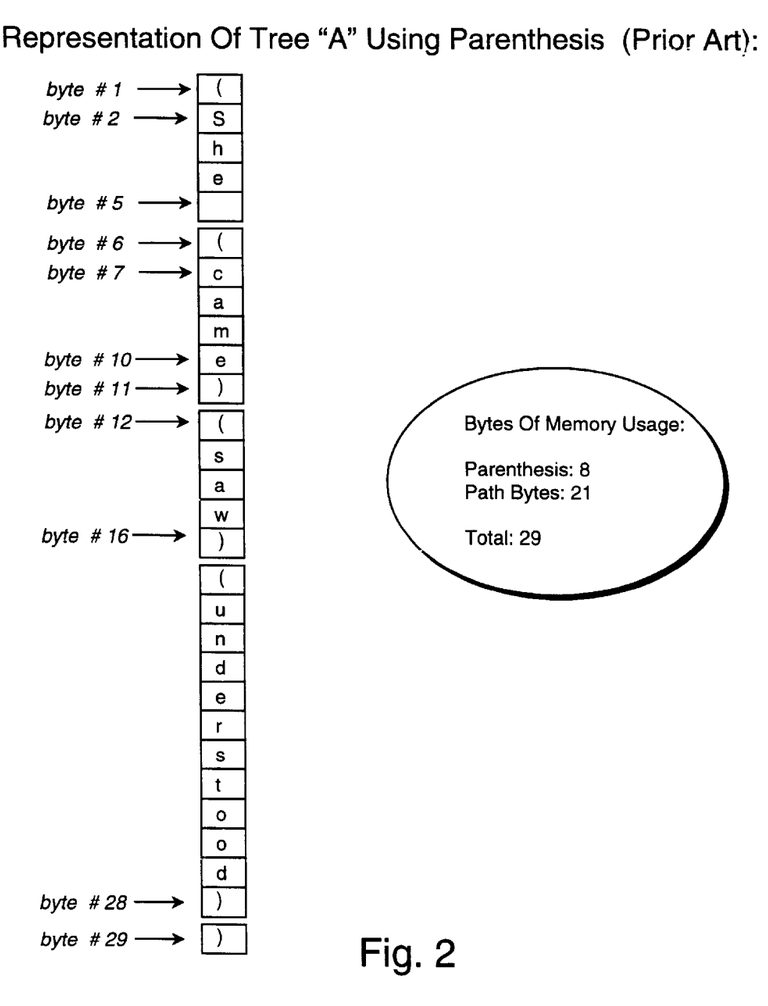
FIG. 2 is a representation of TRIE tree "A" using parentheses in a manner similar to the way Lisp source code uses parentheses to describe cons-list trees.

In FIG. 2, a representation of tree "A" is shown utilizing parenthesis to delimit nodes. Byte #1 contains an open parenthesis which marks the lower boundary of an enclosure. Byte #29 contains a close parenthesis which marks the upper boundary of the same enclosure. This form of representation has been used in the Lisp computer language for decades. In Lisp, the enclosures can be called lists; lists in turn may enclose other lists to form a tree structure.

In FIG. 2 the enclosure bounded by byte #1 and byte #29 contains the elements of tree "A" in a list. The first element of the list is the sequence of letters "She "contained in bytes #2 through #5. This sequence is the contents of the root node of FIG. 1. By design, there is a special purpose to the sequence of bytes immediately following an enclosure bounding open parenthesis and continuing up to the next parenthesis. This sequence contains the node information which heads up the top of a subtree, such as tree "A". Consequently, such sequences are hereinafter referred to as "head path" sequences since they define a header for some of the distinct paths branching to each leaf of a TRIE subtree. For instance, in tree "A", "She "is a header for the distinct paths "She came", "She saw" and "She understood". Trees such as tree "A" may be enclosed (imbedded) in larger subtrees, in which case head path sequences may represent headers which precede internal branches to distinct paths to entire subtrees such as tree "A".

In FIG. 2, byte #6 is another open parenthesis, marking the beginning of the first leaf node of the tree, which has contents "came" in bytes #7 through #10. Byte #11 is a close parenthesis, marking the end of the first leaf node. Byte #12 is an open parenthesis, marking the beginning of the second leaf node "saw", which ends at byte #16. The last leaf node "understand" ends with a close parenthesis at byte #28. As noted above, the tree itself ends with the close parenthesis at byte #29.

Typically, trees of this form have occurred in Lisp source-code files which define Lisp data structures called cons-lists. Cons-lists are tree data structures which store trees as lists-within-lists.

Internally, cons-lists in a Lisp program are stored as pointers to individually allocated memory blocks. The first clue that this traditional use of pointers can consume too much space came to me when I loaded a cons-list list from Lisp source code and found that the program's internal representation of the cons-list consumed more space that the source code.

In FIG. 2, note that only 8 bytes are consumed by parentheses; 21 bytes are consumed by bytes (hereinafter referred to as "path bytes") which contain characters which appear in the distinct paths through tree "A": "She came", "She saw" and "She understood". Thus less than ⅓ of the total space is consumed by parentheses delimiting nodes and defining relationships between nodes.

Because of this compactness, I considered using the Lisp source-code cons-list format to store TRIE trees, but found that to traverse such a format, identifying the boundaries of nodes, it is necessary to sequentially search across entire nodes for matching parentheses. This sequential searching is fast for small nodes, but when the matching parenthesis is separated by the contents of a large node such sequential searching is unnecessarily slow.

If in FIG. 2 the contents of node "saw" were to comprise a list-of-lists a billion bytes in length instead of just 5, it would be very inefficient to determine the length of such a node by starting at its opening parenthesis and examining every adjacent byte from there to the closing parenthesis at the billionth byte. A faster method of skipping from the beginning of a node to the end is essential for basic operations such as hopping between nodes of the same enclosing list. Basic hopping operations are necessary, for instance, when seeking an alphabetical match for a desired first character among nodes of the same enclosing list. For instance, when searching for the distinct path "She understood", a search method would hop from the node "came", examine the first contents byte "c", hop to the node "saw", examine the first contents byte "s", and finally hop to the node "understood".

Figure 3:
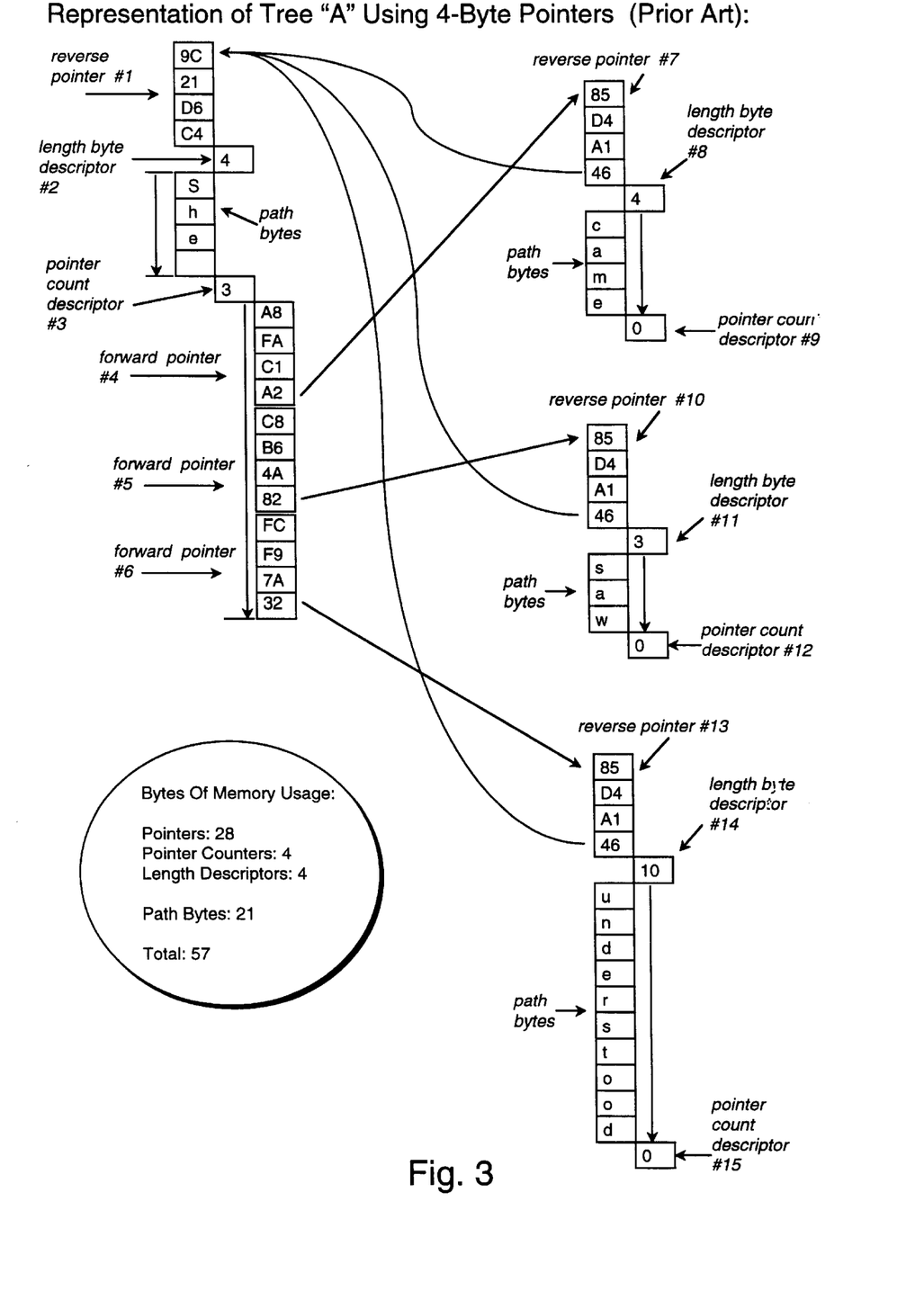
FIG. 3 is a representation of TRIE tree "A" using the prior art of doubly-directed pointers to individually allocated memory blocks.

In contrast, the use of pointers which point to individually allocated blocks of memory is more efficient in terms of the number of CPU operations needed to traverse among nodes branching from a common node, when all nodes are held in memory. FIG. 3 is an example of a pointer-based representation of tree "A".

In FIG. 3, reverse pointer #1 has a hexadecimal value of 9C21D6C4, which back-points to some tree which encloses the node "She ". All nodes in FIG. 3 have a reverse pointer in order that all pointers be bi-directional.

In FIG. 3, length byte descriptor #2 has value 4, meaning that four bytes are stored in the node "She ". This is a representation style native to languages such as Pascal, which begin character string sequences with a length byte describing the number of bytes in the sequence. An alternative method, prevalent in languages such as C, is to reserve one byte-value to serve as an end marker. Either method consumes one byte and both have drawbacks: in C the null-byte character is reserved and requires a workaround for storing null-bytes in a string, in Pascal a string's length cannot exceed 256 bytes, the highest number which can be represented in one byte. For the purpose of demonstration, the length byte descriptor has been shown in Pascal style, although it might have just as easily been shown in C style.

In FIG. 3, pointer count descriptor #3 indicates that just three forward pointers branch from the node "She ". Each pointer contains 4 bytes with hexadecimal values indicated. Each forward pointer points to a block of memory independently allocated for a leafward node. Each leafward node has a reverse pointer pointing back to the forward pointer's memory allocation block; forward pointer #4 is back-pointed by reverse pointer #7, #5 back-pointed by #10 and #6 is back-pointed by #13. Each of the leafward nodes has a length byte descriptor: the node "came" has length byte descriptor #8 with value 4, the node "saw" has length byte descriptor #11 with value 3 and the node "understand" has length byte descriptor #14 with value 10. Each of the leafward nodes also has a pointer count descriptor with value 0 since none have leafward branches to other nodes.

To hop from the leaf node "came" to the leaf node "saw", it only necessary to start at reverse pointer #7, which points to reverse pointer #1, read the length descriptor #2, hop to the address of pointer count descriptor #3, examine forward pointer #4, note that it describes the origin address of reverse pointer #7, skip to forward pointer #5 and go to the address of reverse pointer #10. As long as all pointers are in memory, this method would consume roughly the same CPU time regardless of the node "came" size of contents encoded at descriptor #8 or the number outward branches to other nodes encoded at descriptor #9. Even faster methods of hopping from node to node can be implemented if additional space is allocated for doubly-directing pointers within a node, as well as doubly-directing pointers between nodes.

Although the doubly-directed pointers support efficient hopping between nodes in memory, they exact a penalty in memory consumption. The same 21 path bytes of tree "A" are represented in FIG. 3 as in FIG. 2, but FIG. 3 consumes 57 bytes overall whereas FIG. 2 consumes only 29 bytes, roughly half as many as FIG. 3. This consumption would be even worse for a 64-bit pointer-based computer system, since the pointers would take up twice as much memory, adding 28 more bytes to the overall space consumption.

A further disadvantage of FIG. 3 lies in the dispersal of memory allocations; when accessing logically-adjacent but physically-dispersed nodes on disk-drives, time is wasted by forcing the drive's magnetic head to seek tracks dispersed across the disk, rather than accessing adjacent tracks on the disk.

Figure 4:
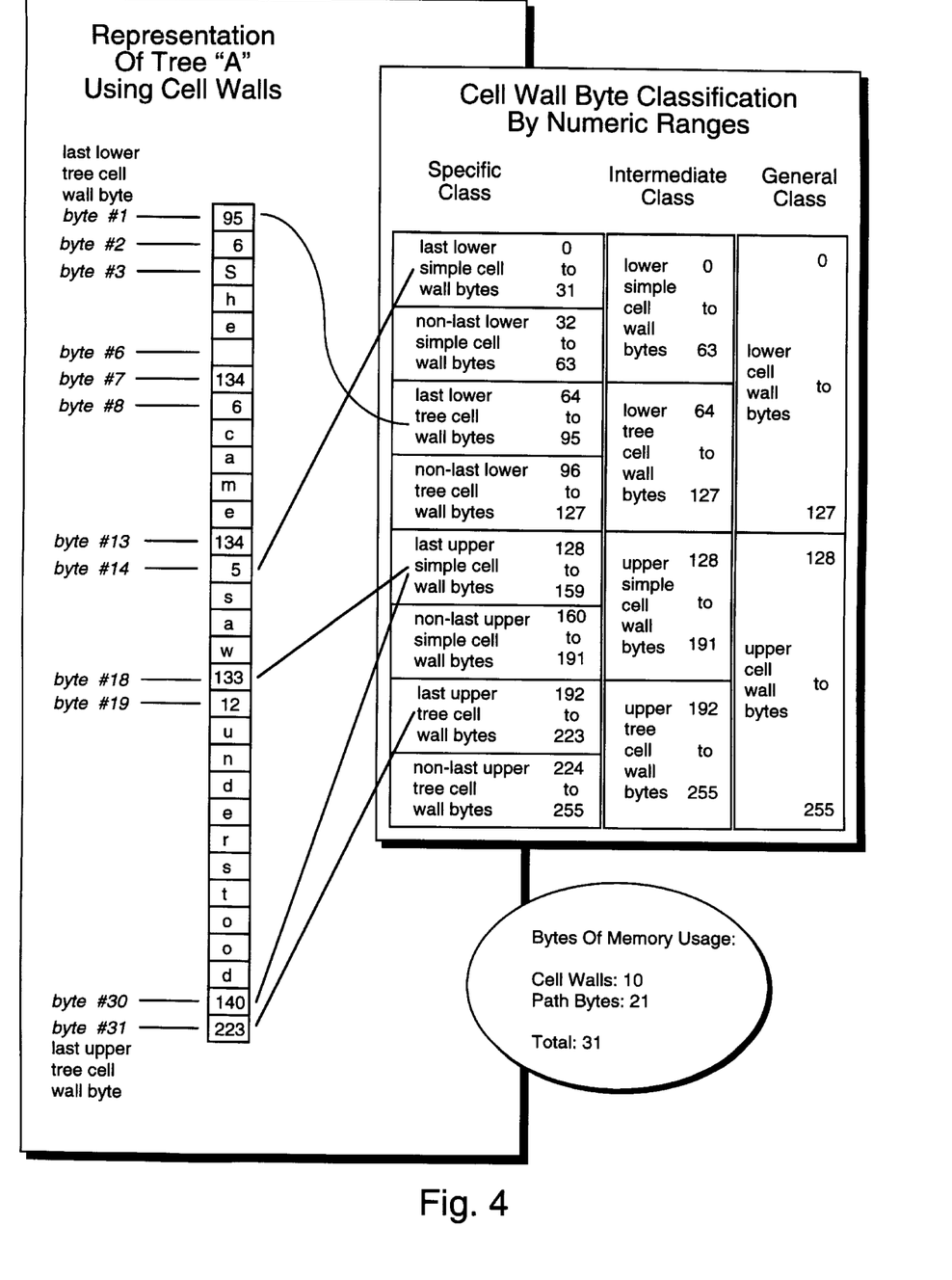
FIG. 4 is a representation of TRIE tree "A" using cell walls and an example of a cell wall byte classification table.

It is an object of the invention to combine the advantages of compactness and contiguous physical storage displayed in FIG. 2 with the advantage displayed in FIG. 3 of efficient traversal from node to node. In FIG. 4, such advantages are combined by replacing the parentheses bytes of FIG. 2 with carefully encoded bytes hereinafter referred to as "cell wall" bytes. Cell wall bytes support the enclosing functionality of parentheses, but they also perform the node-to-node traversal functionality of pointers, by means of a predetermined partition of the domain of integer values a cell wall byte can hold. Memory space enclosed by cell wall bytes, together with their enclosing cell wall bytes are hereinafter referred to as "cells". In this invention, said cells function as the nodes of TRIE trees. An example of a partition of cell wall byte integer domain values is given in the "Cell Wall Byte Classification By Numeric Ranges" chart in FIG. 4.

In the chart, the domain of values 0 through 255 is partitioned into two general classes: 0 through 127 for lower cell wall bytes and 128 through 255 for upper cell wall bytes. The lower cell wall bytes correspond in functionality to the open parentheses of FIG. 2, serving to mark the beginning of an enclosure. The upper cell wall bytes correspond in functionality to the close parentheses of FIG. 2, serving to mark the ending of an enclosure.

Also in the chart, an intermediary level of classification is given, partitioning each of the two general classes into two subclasses, to differentiate between simple cell wall bytes and tree cell wall bytes. By design, simple cells are cells which do not contain other cells. Tree cells on the other hand must enclose at least one simple cell. The distinction between simple and tree cells is important when traversing between cells, since the traversal is performed by hopping from cell wall to cell wall. Simple cells do not enclose any cells to traverse; the differentiation between simple cell and tree cell walls permits leafward traversal to stop upon detection of a simple cell wall.

Also in the chart, a specific classification is given, which further partitions each of the four intermediary classes into two subclasses, to differentiate between last cell wall bytes and non-last cell wall bytes. By design, cell wall bytes are able to support node-to-node traversal by describing the exact length of their cell. Since a cell length might be any positive integer, very large cells would have a length integer far greater than the 255 maximum integer which can be encoded in a single byte.

Consequently, a sequence of adjacent cell wall bytes is used to encode the length of large cells. The larger the length, the longer the sequence. The differentiation between last and non-last bytes is used to mark the end of the sequence. Traversal methods for starting with lower cell walls may begin with the lowest lower cell wall byte. If this byte is the only lower cell wall byte, limiting the length of the cell to less than 32 bytes, it will be encoded as a last cell wall byte. However, if the length of the cell is 32 or more bytes, the lowest lower cell wall byte must be encoded as a non-last cell wall byte and the sequence of lower cell wall bytes will continue another byte, to the next adjacent higher byte, until a last lower cell wall byte marks the end of the sequence.

Upper cell wall bytes encode cell length in a similar pre-determined manner. Sequences of adjacent upper cell wall bytes are used to encode the length of large cells. As for lower bytes, the larger the length, the longer the sequence. Traversal methods starting with upper cell walls may begin with the uppermost upper cell wall byte. If this byte is the only upper cell wall byte, limiting the length of the cell to less than 32 bytes, it will be encoded as a last cell wall byte. However, if the length of the cell is 32 or more bytes, the uppermost upper cell wall byte must be encoded as a non-last cell wall byte and the sequence of upper cell wall bytes will continue another byte, to the next adjacent lower byte, until a last upper cell wall byte marks the end of the sequence.

In the example given in FIG. 4, the length information encoded in sequences of cell wall bytes is based on higher powers of 32 for each successive byte in the sequence. The first byte (which is either lowest or uppermost of the cell wall bytes) encodes 32 to the zeroth power, thus encoding a multiplication factor of 1. Since the domain of values allocated to each specific class in the chart spans 32 integer values, the first byte encodes the numbers 0 through 31.

Any second bytes encode 32 to the first power, thus encoding a multiplication factor of 32. Since the domain of values allocated to each specific class in the chart spans 32 integer values, the second byte encodes the numbers 0, 32, 64, 96, etc. up through 992.

Any third bytes encode 32 to the second power, thus encoding a multiplication factor of 1024. Since the domain of values allocated to each specific class in the chart spans 32 integer values, the third byte encodes the numbers 0, 1024, 2048, 3072, etc. up through 31744.

The example given in FIG. 4 encodes large cell lengths of one megabyte using only 5 bytes of cell wall sequence length, resulting in a very small amount of space consumed relative to overall cell size. The predetermined classification of cell wall bytes given in FIG. 4 could be varied considerably to accommodate variations in design objective trade-offs. For instance, a more detailed classification of cell wall bytes could be made to encode additional information needed when traversing cells, such as whether or not a cell is first and/or last in its enclosing cell. As a trade-off, this would at the same time reduce the domain of values allocated to each class to a domain of 16 integer values, increasing the number of sequence bytes needed to represent small cells of length 16 through 31.

Other design trade-offs might allocate a larger domain of values to the simple cells than to the tree cells, thus consuming less space when representing TRIE trees consisting mostly of simple cells with length between 32 and 63 bytes.

The example given in FIG. 4 is meant for simplicity in coding. However, other methods of storing cell length sequences might further simplify coding, depending on the host CPU and language used. Rather than using the lowest of the lower cell wall and uppermost of the upper cell wall as starting points for the first byte in sequences encoding cell lengths, it is possible to use the lowest of the lower cell wall and lowest of the upper cell wall as starting points for the first byte encoding sequences. This would allow the function which acquires the cell length encoded within sequences to be coded once, rather than coded once for lower cell walls and once again for upper cell walls. This savings in code space consumption may or may not be significant, depending of the particular host CPU and language used.

The classification of cell wall numeric ranges might be made for units other than an 8-bit byte. For instance, some other number of bits might be used as the basic unit, particularly if it matches some set of bits efficiently handled by a particular CPU.

In the representation of tree "A" in FIG. 4, the node "She "is encoded using an outermost cell which encloses the other cells. This outermost cell begins at byte #1. The value encoded in byte #1 is 95, which puts it in the cell wall byte classification of last lower tree cell wall byte. In this class, the domain assigned is 64 to 95 bytes, so the value encoded is the 32nd of its domain, representing a length of 31. The multiplier factor for this first byte position in the sequence of bytes is 1, and being a last byte, there are no more bytes in the sequence so the actual length encoded is 31. This actual length of 31 can be used to hop to the uppermost upper cell wall byte. The length minus one plus the address of the lowermost lower cell wall byte gives the address of the uppermost upper cell wall byte; 31 minus 1 plus 1 gives an address of byte #31.

Byte #31 is the uppermost upper cell wall byte. The value encoded in byte #31 is 223, which puts it in the cell wall byte classification of last upper tree cell wall byte. In this class, the domain assigned is 193 to 223 bytes, so the value encoded is the 32nd of its domain, representing a length of 31. The multiplier factor for this first byte position in the sequence of bytes is 1, and being a last byte, there are no more bytes in the sequence so the actual length encoded is 31. This length of 31 can be used to hop to the lowest lower cell wall byte. The address of the uppermost upper cell wall byte plus one, minus the length gives the address of the lowest lower cell wall byte; 31 plus 1 minus 31 gives an address of byte #1.

Thus the space consumed by the outermost cell which begins at byte #1 and ends at byte #31 can be hopped over beginning at either end, using the information encoded in its cell wall bytes. The symmetry provided by using both upper and lower cell wall bytes can be helpful when traversing from cell to cell, but it is not always necessary in all applications of cell wall systems. For instance, if a cell wall tree is being transmitted across a network from one workstation to another using a protocol with guaranteed accuracy, it may be useful to save transmission time by stripping off the upper cell walls from the transmission since that information is redundant.

Similarly, when traversing a cell wall tree, as long as the traversal is leafward in direction the upper cell wall information is unused and redundant; if it is pre-determined that some particular tree is to be traversed solely leafward, it might be useful to save space by constructing the cell tree using only lower cell walls.

In FIG. 4, byte #2 has value 6, which puts it in the cell wall byte classification of last lower simple cell wall byte. In this class, the domain assigned is 0 to 31 bytes, so the value encoded is the 6th of its domain, representing a length of 6. The multiplier for this first byte position in the sequence of bytes is 1, and being a last byte, there are no more bytes in the sequence so the actual length encoded is 6. This length of 6 can be used to hop to the uppermost upper cell wall byte. The length minus one plus the address of the lowermost lower cell wall byte gives the address of the uppermost upper cell wall byte; 6 minus 1 plus 2 gives an address of byte #7.

This cell which begins at byte #2 and ends at byte #7 contains the head path sequence "She "for the representation of tree "A". By design, the lowest enclosed cell inside a tree cell is a simple cell containing the head path contents for the tree cell's branches. This is similar to the design of FIG. 2, where the head path sequence immediately follows the tree enclosure bounding open parenthesis and continues up to the next parenthesis. However, the design of FIG. 4 consume more bytes per head path sequence, since there are no reserved characters such as the open or close parenthesis to mark the boundaries of the head path sequence. Instead, upper and lower simple cell walls are used to mark the ends of the head path sequence. The head path sequence in FIG. 4 from byte #3 to byte #6 together with its cell wall bytes #2 and #7 comprise what is referred to hereinafter as a "head path cell" which by design is required to be the lowest enclosed cell inside a tree cell.

The meaning of a head path cell is different from all other cells enclosed inside a tree cell; it alone contains the tree cell's head path sequence. The other enclosed cells contain path bytes branching leafward from the head path sequence. In the example given in FIG. 4, the predetermined position of the head path cell relative to its enclosing tree cell is the lowest enclosed cell of the tree cell, but that predetermination is somewhat arbitrary. It would be equally possible to predetermine the position as the highest enclosed cell, or some other convenient position.

If other useful information about the tree cell needed to be encoded, such as statistics on tree size and number of leafs enclosed (to enable a method such as in U.S. Pat. No. 5,355,473 by Au where the hierarchic number of leafs is encoded in each tree node), a required cell hereinafter referred to as a "utility cell" might be placed in a predetermined position within tree cells. The predetermined position for a utility cell might be the lowest enclosed cell, at the same time predetermining the head path cell placement in another predetermined position such as the second highest enclosed cell.

Thus a range of possible required cells may be placed in predetermined positions relative to a tree cell. This being done, other structures may be added to tree cells.

For instance, for the purpose of localizing the allocation of space, tree cells may contain extra reserve space in some predetermined location relative to the tree cell walls. The amount and location of this reserve space may be encoded within a utility cell, or it may be encoded directly in cell wall bytes by an alternative cell wall byte classification scheme.

Such unused reserve space would absorb space yielded by deletion of information and it would provide space for addition of information within the tree cell enclosure, in a manner local to individual tree cell subtrees. The localization of reserve space would help prevent excessive shifting of memory bytes when information is added or removed from individual subtrees deep within a TRIE tree representation; the reserve space enclosed within individual subtrees would buffer small additions or removals locally within the individual subtree, so that only large additions and removals would result in shifting of bytes outside the individual subtree to keep cell walls enclosed by the TRIE tree in contiguous adjacent alignment relative to each other.

Another useful kind of information which could be predetermined to be part of each tree cell is the total utilized space contained within the tree cell. This information would help to quickly determining the ratio of unused to utilized space within the tree cell, thus providing information to methods designed to optimize that ratio for performance reasons, such methods similar to advanced memory management systems that attempt to optimally allocate and re-allocate buffer memory.

Overall, the consumption of memory in FIG. 4 is 31 bytes, which is very close the 29 bytes consumed in FIG. 2, and far less than the 57 bytes consumed in FIG. 3. Methods of traversal from node to node in FIG. 4 are described later, to demonstrate that such traversals can be done without the overhead of examining path bytes, just as traversals of nodes in FIG. 3 are possible without examining path bytes.

In FIG. 4, byte #8 marks the beginning of a simple cell which contains the leafward node "came". The value of byte #8 is 6, which puts it in the cell wall byte classification of last lower simple cell wall byte. In this class, the domain assigned is 0 to 31 bytes, so the value encoded is the 6th of its domain, representing a length of 6. The multiplier for this first byte position in the sequence of bytes is 1, and being a last byte, there are no more bytes in the sequence so the actual length encoded is 6. This length of 6 can be used to hop to the uppermost upper cell wall byte. The length minus one plus the address of the lowermost lower cell wall byte gives the address of the uppermost upper cell wall byte; 6 minus 1 plus 8 gives an address of byte #13. Thus the simple cell which contains the first leafward node "came" ends at byte #13.

Similarly, the cell containing the second leafward node "saw" begins at the immediately adjacent byte #14, and ends at byte #18. The third and last leafward cell contains the node "understood" beginning at byte #19 and ending at byte #30. All three leafward cells are directly enclosed by the same tree cell node, and hereinafter leafward nodes directly enclosed by a common tree cell node are referred to as "sibling nodes" or "sibling cells".

When traversing from sibling cell to the next higher sibling cell, the next higher sibling cell is always immediately adjacent, so that no space is wasted between cells, and so that no method is needed to traverse space between cells. Another advantage of the example in FIG. 4 is that the byte immediately above a sibling cell is a bottom cell wall byte if there is a higher sibling cell, but the byte immediately above a sibling cell is a top cell wall byte of the enclosing tree cell if there is no higher sibling cell. This permits a method of traversing from sibling cell to higher sibling cell that is solely based on a pointer to the current sibling cell's lowest cell wall byte or uppermost cell wall byte.

Figure 5:
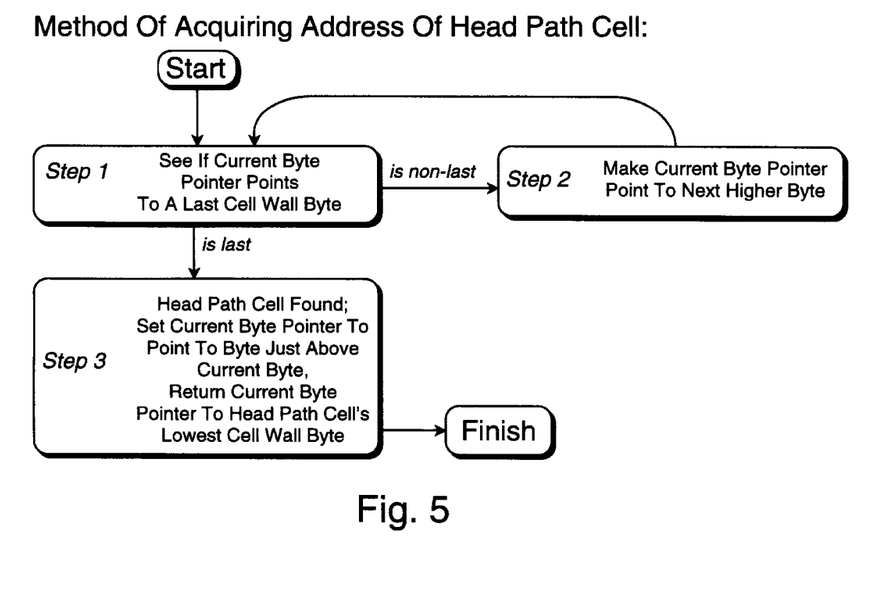
FIG. 5 is a method for acquiring the address of a head path cell, given the address of its enclosing tree cell, in a manner appropriate for the cell walls as given in FIG. 4.

A number of basic cell-to-cell traversal methods are outlined for the example of FIG. 4. In FIG. 5, a method of traversing from a lowest lower cell wall byte of a tree cell to the lowest lower cell wall byte of its head path cell is given. Starting in Step 1 of FIG. 5, the current byte pointer might be pointing to the first lower tree cell wall byte of a sequence having more than one cell wall byte, in which case Step 2 is performed, to skip past all non-last cell wall bytes, looping back to Step 1. If a last cell wall byte is found, Step 3 is performed; the next higher byte must be the head path cell's lowest lower cell wall byte, since the lowest enclosed cell of the tree cell is predetermined position of head path cells.

Figure 6:
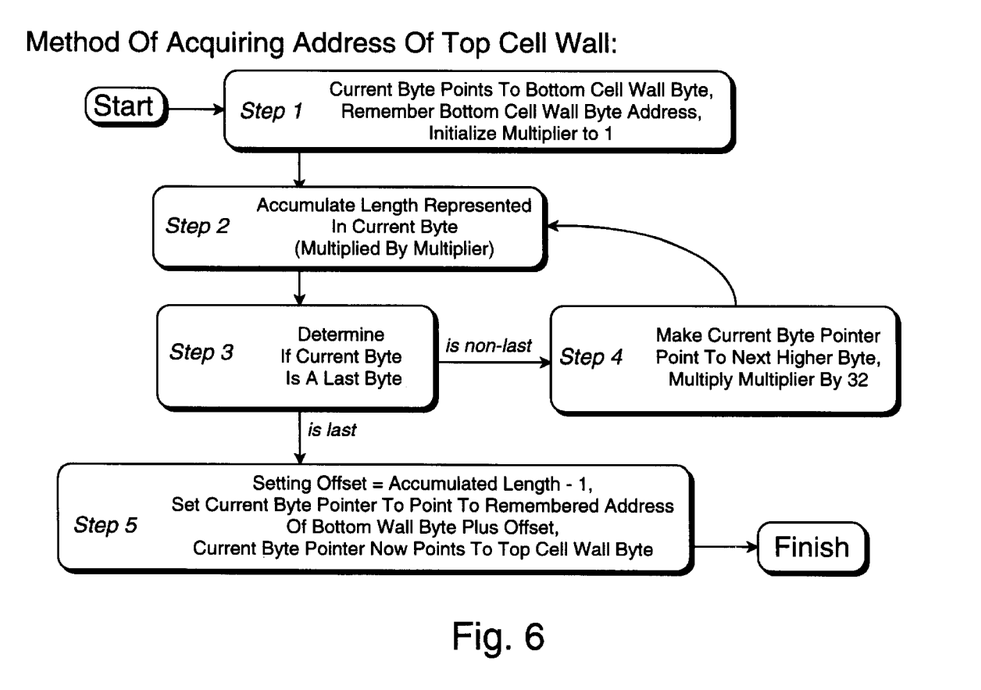
FIG. 6 is a method for acquiring the address of the top cell wall byte of a cell, given the address of the bottom cell wall byte, for cells of the format given in FIG. 4.

In FIG. 6, the method of acquiring the address of the uppermost top cell wall byte by starting from the lowest lower cell wall byte is given (this method has already been briefly outlined above). Using a more complex example of a tree cell in FIG. 11, the method of FIG. 6 will be discussed later.

Figure 7:
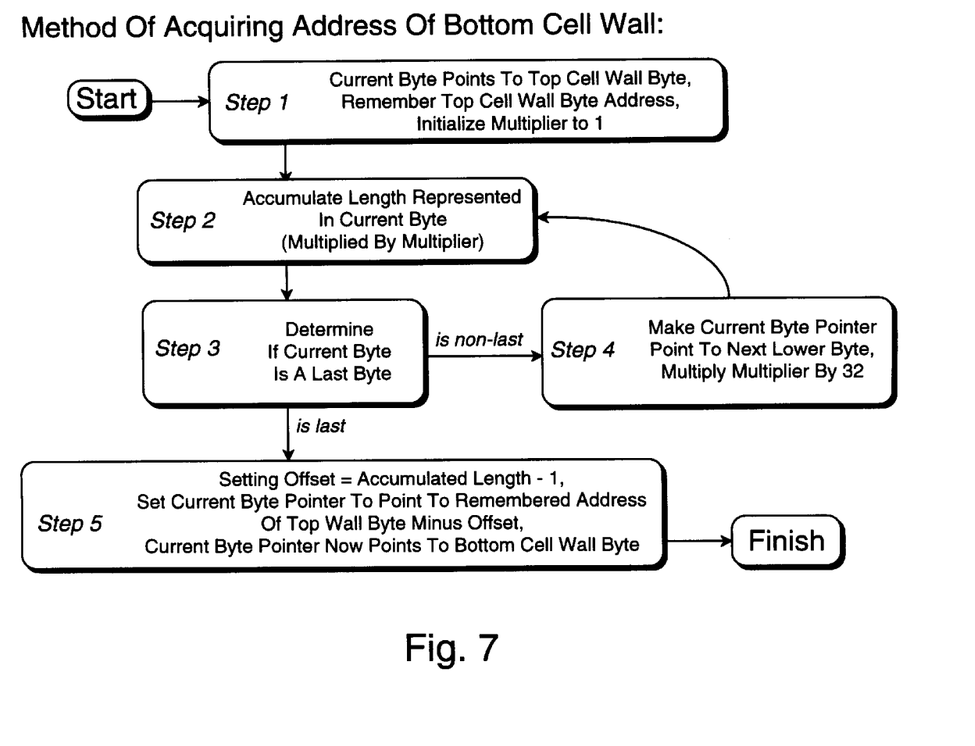
FIG. 7 is a method for acquiring the address of the bottom cell wall byte of a cell, given the address of the top cell wall byte, for cells of the format given in FIG. 4.

In FIG. 7, a method of acquiring the address of the lowest bottom cell wall byte by starting from the uppermost upper cell wall byte is given (this method has also already been briefly outlined above). Using the more complex example of a tree cell in FIG. 11, the method of FIG. 7 will also be discussed later.

Figure 8:
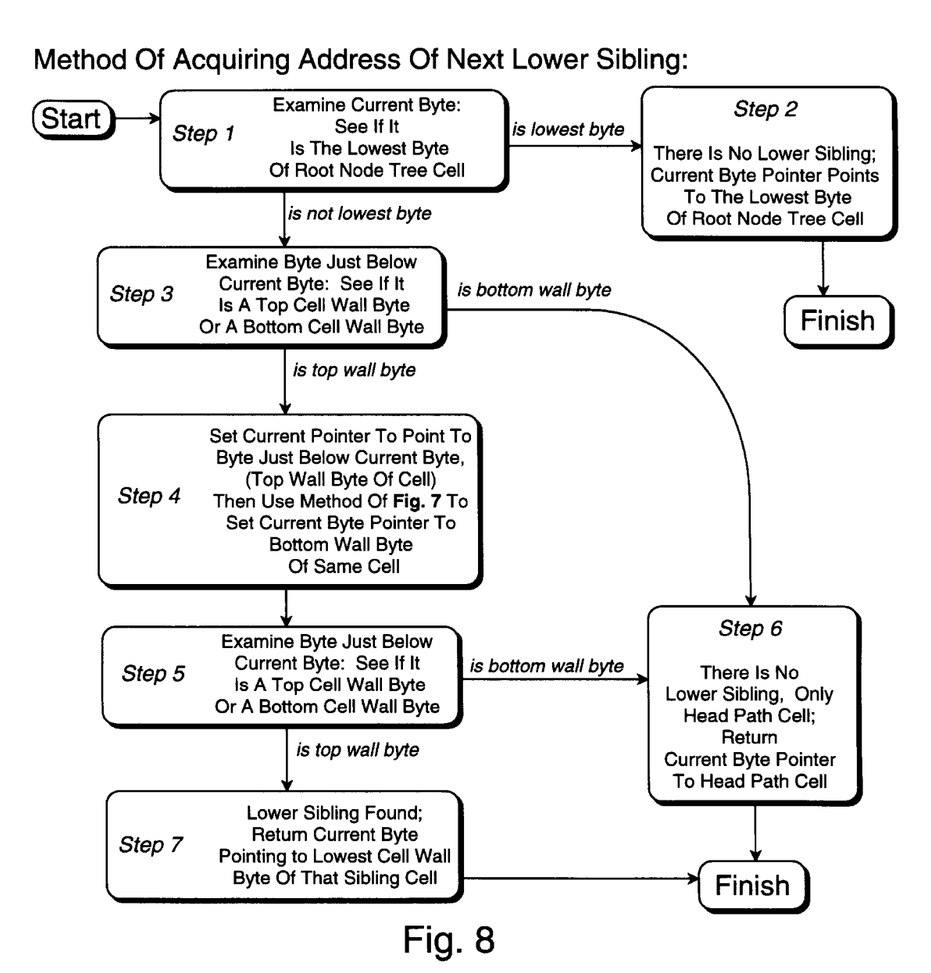
FIG. 8 is a method for acquiring the address of the next lower sibling cell bottom cell wall byte, given the bottom cell wall byte of a cell, for cells of the format given in FIG. 4.

In FIG. 8, the method of acquiring the address of a next lower sibling starting from the lowest lower cell wall byte of a sibling cell is given. An example of use of this method using FIG. 4 starting with byte #14 follows:

At Step 1, the current byte points to byte #14. It is important to check to see if this byte is the lowest possible byte in the tree cell (root node) which encloses all other cells, since to go any lower might access memory not allocated for cell tree traversal, causing a memory bounds violation. If the current byte is the lowest byte of the root node tree cell, Step 2 stops the method short, returning information stating that there is no lower sibling cell.

Since byte #14 is not the lowest byte in the root node tree cell (that would be byte #1) Step 1 determines that there is a lower byte, namely byte #13. Step 3 examines it, to see if it is a top cell wall byte or a bottom cell wall byte. Byte #13 has value 134, which puts it in the top cell wall byte class. Therefore, there is some kind of cell below byte #14. But at this point, it is undetermined as to whether the cell below is a head path cell or a next lower sibling cell. Therefore in Step 4, the current pointer is set to hop to the bottom of the cell below, to help determine whether the cell below is a head path cell or a next lower sibling cell. After Step 4, the current byte pointer points to byte #8. In Step 5, the byte just below is examined to see if it is a top cell wall byte or a bottom cell wall byte. A bottom cell wall byte would indicate that the cell just hopped over was the head path cell, since the bottom cell wall byte must belong to an enclosing tree cell. However, since the byte #7 examined has value 134, Step 5 detects a top cell wall byte, which means that byte #8 must be the lowest lower cell wall byte of the next lower sibling. Consequently, Step 8 is performed, returning a pointer to byte #8 as the lowest lower cell wall byte of the next lower sibling.

If the method of FIG. 8 were used starting with byte #8, the following steps would be performed:

At Step 1, byte #8 would be not be the lowest byte #1, so Step 3 would be performed next. At Step 3, the byte just below the current byte would be #7 with a value of 134, which puts it in the top cell wall byte class. Therefore, there is some kind of cell below byte #8. But at this point, it is undetermined as to whether the cell below is a head path cell or a next lower sibling cell. Therefore in Step 4, the current pointer is set to hop to the bottom of the cell below, to help determine whether the cell below is a head path cell or a next lower sibling cell. After Step 4, the current byte pointer points to byte #2. In Step 5, the byte just below is examined to see if it is a top cell wall byte or a bottom cell wall byte. A bottom cell wall byte would indicate that the cell just hopped over was the head path cell, since the bottom cell wall byte must belong to an enclosing tree cell. Since the byte #1 examined has a value of 95, Step 5 detects a bottom cell wall byte, which means that byte #2 must be the lowest lower cell wall byte of a head path cell. Consequently, Step 6 is performed, returning a pointer to byte #2 as the lowest lower cell wall byte of a head path cell.

Figure 9:
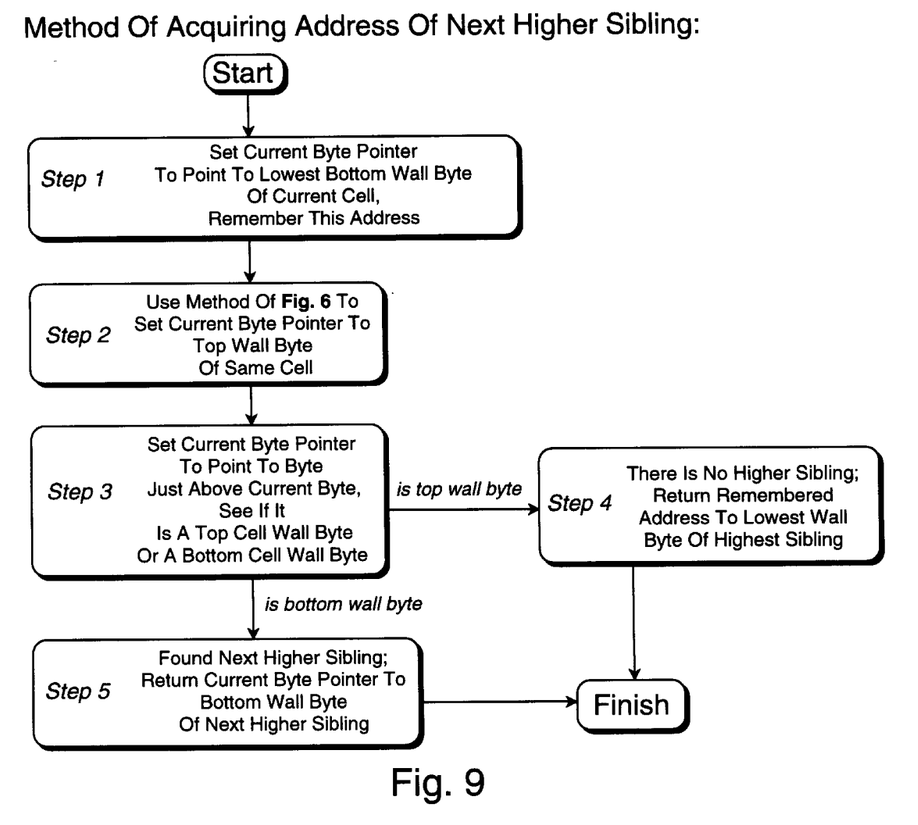
FIG. 9 is a method for acquiring the address of the next higher sibling cell bottom cell wall byte, given the bottom cell wall byte of a cell, for cells of the format given in FIG. 4.

In FIG. 9, a method of acquiring the address of a next higher sibling starting from the lowest lower cell wall byte of a sibling cell is given. An example of use of this method using FIG. 4 starting with byte #14 follows:

At Step 1, the current byte pointer points to byte #14. At Step 2, the method of FIG. 6 is used to set the current pointer to point to byte #18. At Step 3, the current pointer is set to point to byte #19. Since byte #19 has the value 12, this is a bottom wall byte. Consequently, Step 5 is performed, returning a pointer to byte #19 as the lowest lower cell wall byte of the next higher sibling cell.

If the method of FIG. 9 were used starting with byte #19, the following steps would be performed:

At Step 1, the current byte pointer points to byte #19. At Step 2, the method of FIG. 6 is used to set the current pointer to point to byte #30. At Step 3, the current pointer is set to point to byte #31. Since byte #31 has the value 223, this is a top wall byte. Consequently, Step 4 is performed, returning a pointer to byte #19 as the lowest lower cell wall byte of the highest sibling cell and also returning information indicating that no higher sibling was found.

Figure 10:
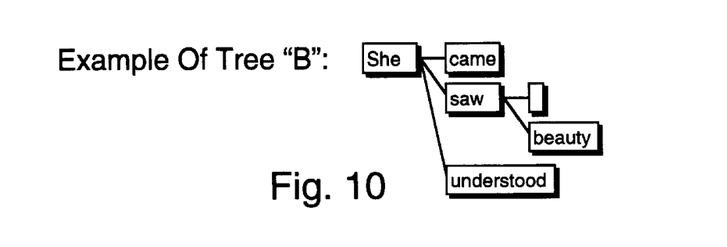
FIG. 10 is an example of a TRIE tree "B" which is similar to TRIE tree "A" of FIG. 1 except that is has additional complexity in one branch; one of the cells of "A" having no enclosed cells is replaced in "B" by a cell containing two cells.

In FIG. 10, a TRIE tree "B" is shown which is the same as tree "A" except that the node "saw" has been replaced by a subtree containing an empty leaf cell and the leaf cell "beauty". The advantage of an empty leaf cell such as in tree "B" is that is supports the representation of distinct paths which terminate immediately leafward of a tree cell, rather than terminating after one or more path bytes leafward of a tree cell.

Figure 11:
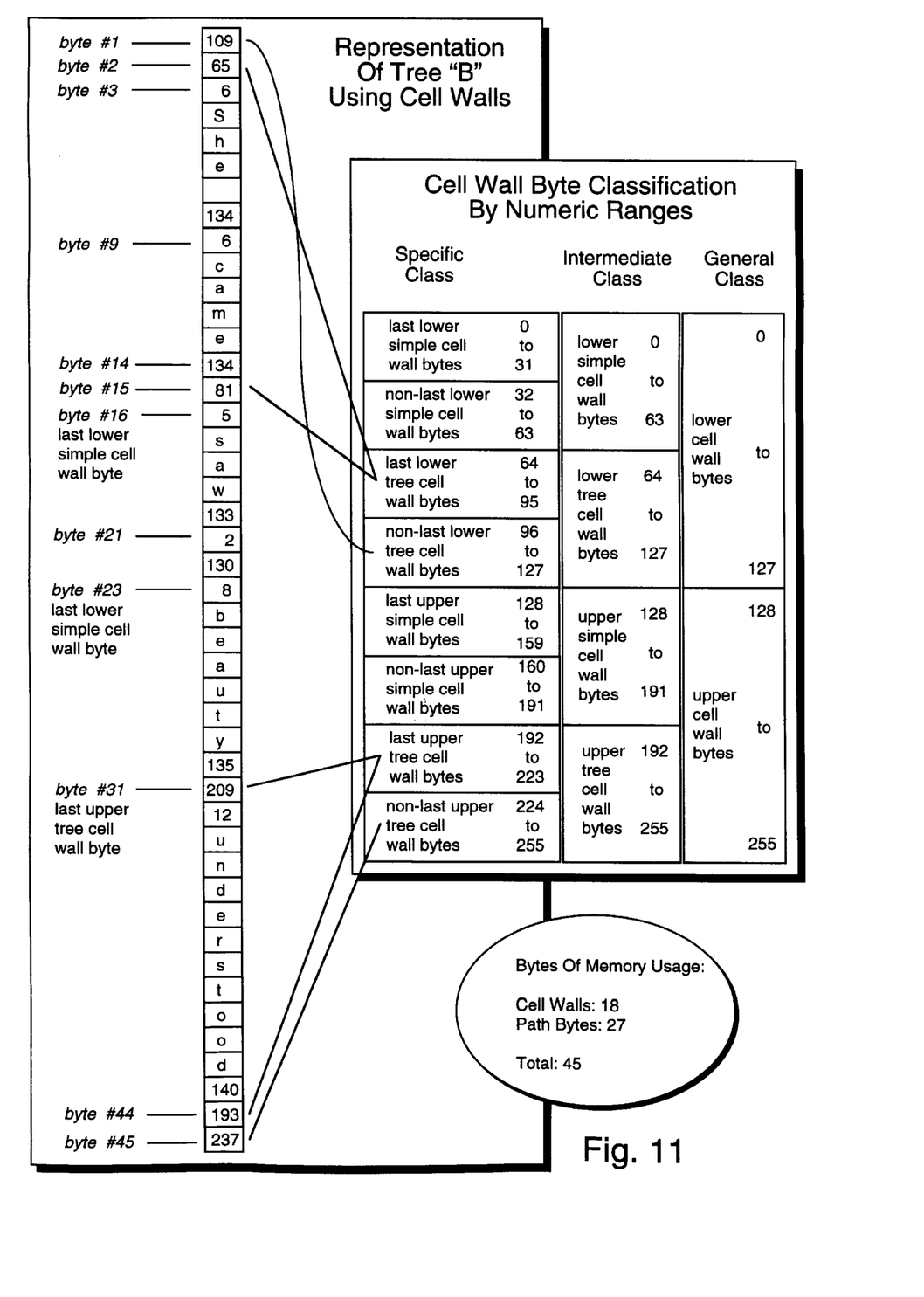
FIG. 11 is a representation of TRIE tree "B" using cell walls and an example of a cell wall byte classification table.

In FIG. 11, the TRIE tree "B" is represented using the same Cell Wall Byte Classification By Numeric Ranges as FIG. 4. The additional complexity of tree "B" increases the number of bytes consumed by the outermost tree cell to 45 bytes from 31 bytes. Consequently, the number of sequence bytes for the tree cell wall is more than just one byte, providing an example for the use of FIG. 6's method of acquiring the address of the uppermost top cell wall byte by starting from the lowest lower cell wall byte.

Using the method outlined in FIG. 6 on the example of tree "B" in FIG. 4, at Step 1, the current byte pointer points to byte #1. At Step 2, byte #1 holds a value of 109 corresponding to the class of non-last lower tree cell wall bytes. In that class, the domain is 96 to 127, so 77 represents a length of 13 within that domain. Since the multiplier factor for the first byte is 1, the length accumulated from the first byte is 13. In Step 3, the current byte is determined to be non-last, so Step 4 is performed. The current byte pointer is pointed to byte #2, and the multiplier factor is increased to 1 times 32 which equal 32.

Step 2 then is performed again on byte #2, which holds a value of 65 corresponding to the class of last lower tree cell wall bytes. In that class, the domain is 64 to 95, so 65 represents a length of 1 within that domain. Since the multiplier factor for the second byte is 32, the length accumulated from the second byte is 32. Together with the length accumulated from the first byte, the total length accumulated is 45. Step 3 is then performed again, but this time the current byte is a last byte, so Step 5 is performed.

Setting the Offset to the accumulated length minus 1, the Offset becomes 44, which is added to the address of the remembered lowest lower wall byte #1 to set the current pointer to the address of byte #1 plus 44. Thus the pointer to the address of byte #45 is returned as the pointer to the uppermost upper cell wall byte.

Using the method outlined in FIG. 7 on the example of tree "B" in FIG. 4, at Step 1, the current byte pointer points to byte #45. At Step 2, byte #45 holds a value of 237 corresponding to the class of non-last upper tree cell wall bytes. In that class, the domain is 224 to 255, so 237 represents a length of 13 within that domain. Since the multiplier factor for the first byte is 1, the length accumulated from the first byte is 13. In Step 3, the current byte is determined to be non-last, so Step 4 is performed. The current byte pointer is pointed to byte #44, and the multiplier factor is increased to 1 times 32 which equal 32.

Step 2 then is performed again on byte #44, which holds a value of 193 corresponding to the class of last upper tree cell wall bytes. In that class, the domain is 192 to 223, so 193 represents a length of 1 within that domain. Since the multiplier factor for the second byte is 32, the length accumulated from the second byte is 32. Together with the length accumulated from the first byte, the total length accumulated is 45. Step 3 is then performed again, but this time the current byte is a last byte, so Step 5 is performed.

Setting the Offset to the accumulated length minus 1, the Offset becomes 44, which is subtracted from the address of the remembered uppermost upper wall byte #45 to set the current pointer to the address of byte #45 minus 44. Thus the pointer to the address of byte #1 is returned as the pointer to the lowest lower cell wall byte.

The methods given in FIG. 6 and FIG. 7 work similarly on simple cell walls, except that the specific numeric range classes assigned to simple cell walls are involved instead of numeric range classes assigned to tree cell walls.

Figure 12:
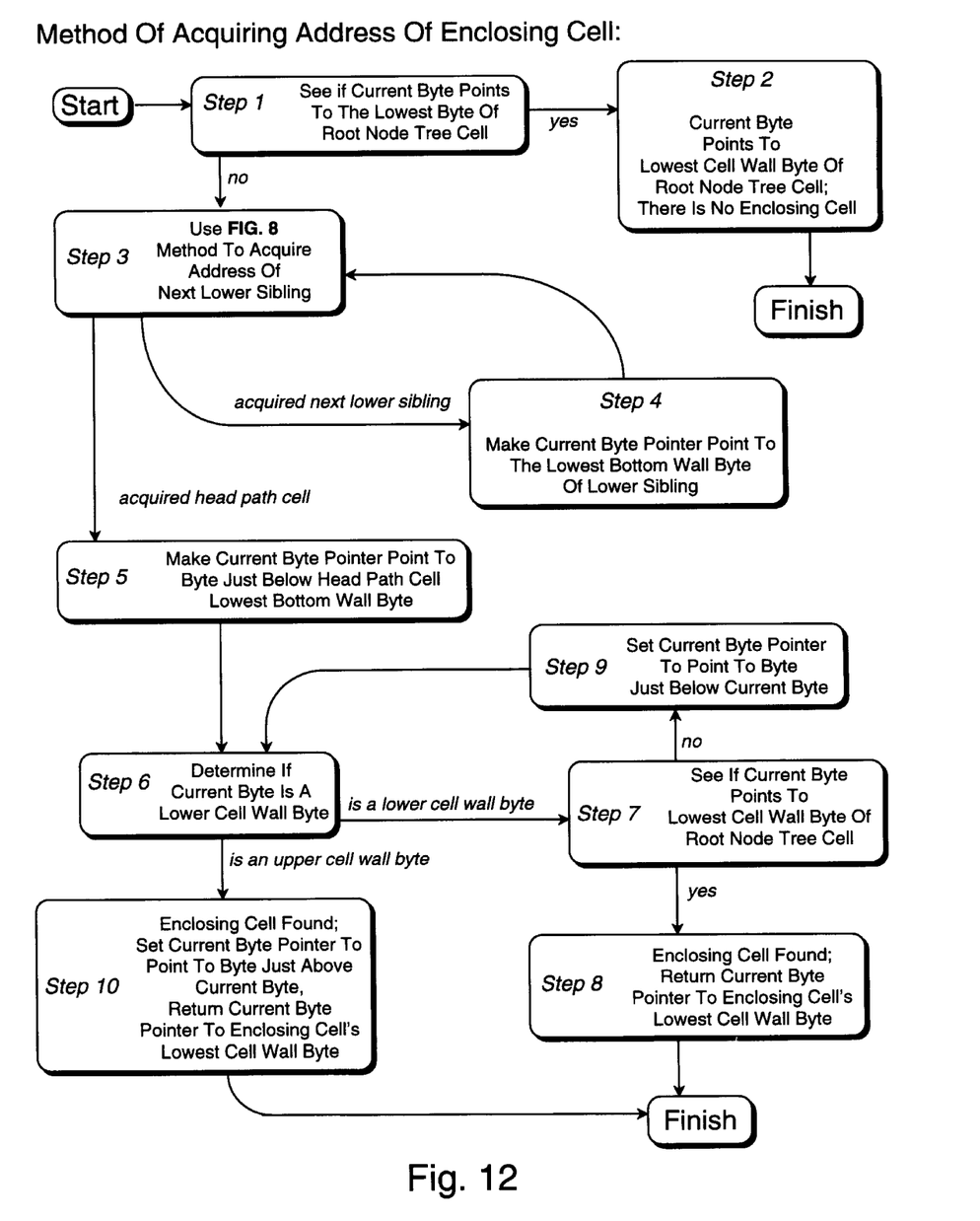
FIG. 12 is a method of acquiring the address of an enclosing cell bottom cell wall byte, given the bottom cell wall byte of a cell, for cells of the format given in FIG. 10.

In FIG. 12, a method of acquiring the address of an enclosing cell starting from the lowest lower cell wall address of a cell is given. This method is useful for traversing rootward in a TRIE tree. Since the tree "B" in FIG. 11 has a subtree within the outer enclosing tree, it provides a context for an example of the use of the method of FIG. 12 a number of successive times:

The first time the method of FIG. 12 is used, in Step 1, the current byte pointer points to FIG. 11 byte #23 of the cell "beauty". Since this is not the lowest byte of the root node tree cell (that would be byte #1), Step 3 is performed. The method of FIG. 8 is used to acquire the address of the next lower sibling.

The method of FIG. 8 returns a pointer to the next lower sibling at byte #21, so Step 4 is performed. The current byte pointer is set to point to byte #21, and Step 3 is performed again.

The method of FIG. 8 return a pointer to the head path cell at byte #16, so Step 5 is performed. The current byte pointer is set to point to byte #15, and then Step 6 is performed.

In Step 6, the current byte #15 has value 81, which is a lower cell wall byte. Consequently, Step 7 is performed to help acquire the lowest lower cell wall byte by going lower. In Step 7, the current byte address #15 is checked to see if it is the lowest possible address of the root node tree cell (that would be byte #1). Since it is not, Step 9 is performed, to set the current byte pointer lower, pointing to byte #14. Step 6 is then performed again.

In Step 6, the current byte #14 has value 134, which is a upper cell wall byte. Consequently, Step 10 is performed, since the current byte has passed the lowest lower cell wall byte of the desired tree cell.

In Step 10, the current byte pointer is set to point to byte #15, and this pointer to the enclosing tree cell's lowest lower cell wall byte is returned.

If the method of FIG. 12 is used a second time, this time on FIG. 11 byte #15, the following steps would be performed:

In Step 1, the current byte pointer points to FIG. 11 byte #15 of the tree cell whose head path cell contains "saw". Since this is not the lowest byte of the root node tree cell (that would be byte #1), Step 3 is performed. The method of FIG. 8 is used to acquire the address of the next lower sibling.

The method of FIG. 8 returns a pointer to the next lower sibling at byte #9, so Step 4 is performed. The current byte pointer is set to point to byte #9, and Step 3 is performed again.

The method of FIG. 8 return a pointer to the head path cell at byte #3, so Step 5 is performed. The current byte pointer is set to point to byte #2, and then Step 6 is performed.

In Step 6, the current byte #2 has value 65, which is a lower cell wall byte. Consequently, Step 7 is performed to help acquire the lowest lower cell wall byte by going lower. In Step 7, the current byte address #2 is checked to see if it is the lowest possible address of the root node tree cell (that would be byte #1). Since it is not, Step 9 is performed, to set the current byte pointer lower, pointing to byte #1. Step 6 is then performed again.

In Step 6, the current byte #1 has value 109, which is a lower cell wall byte. Consequently, Step 7 is performed again. Since the current byte #1 is the lowest possible address of the root node cell, Step 8 is performed.

In Step 8, the current byte pointer pointing to byte #1 of the enclosing tree cell's lowest lower cell wall byte is returned.

If the method of FIG. 12 is used a third time, this time on byte #1 of FIG. 11, the method would quickly return, because there is no enclosing cell for the root node cell:

In Step 1, the current byte pointer points to FIG. 11 byte #1. Since this is the lowest byte of the root node tree cell, Step 2 is performed. Information is returned stating that there is no enclosing cell for the root node tree cell.

I claim:

1. In a data-processing system, a method executed by a data processor for fetching the size of an allocated contiguous section of memory, by decoding a sequence of bitmaps, said sequence of bitmaps located adjacent to a boundary of said section of memory, each of said bitmaps containing information describing whether that bitmap is last or not last in its sequence of bitmaps, each of said bitmaps containing information describing a length number, said method employing a radix number constant, said method comprising the steps of:

(a) designating a bitmap adjacent to a boundary of said section of memory to be the current bitmap, then fetching said length number information contained within said current bitmap, initializing a multiplier number to one, initializing an accumulator number to zero, proceeding to step b, (b) multiplying said length number by said multiplier number and adding the result to an accumulator number, proceeding to step c, (c) reading the current bitmap to see whether or not the current bitmap is last in its sequence, then if the current bitmap is last in its sequence, proceeding to step d, otherwise proceeding to step f, (d) designating the next bitmap in said sequence to be the current bitmap, proceeding to step e, e) reading said current bitmap to fetch said length number information contained within, multiplying said multiplier number by said radix number, proceeding to step b, (f) returning the accumulator number as the size of said section.

2. The method of claim 1 wherein said accumulator number is initialized to a non-zero number in step a.

3. The method of claim 1 wherein said multiplier number is initialized to a number other than one in step a.

4. The method of claim 1 wherein said multiplier number is fetched from a table indexed by the number of times step b has been performed.

5. The method of claim 1 wherein the multiplication operation on said length number is replaced by a shift-left or shift-right operation on the bits representing said length number.

6. The method of claim 1 wherein the radix number is fetched from a table indexed by the number of times step b has been performed.

7. The method of claim 1 wherein a set of integer values stored in each said bitmap is mapped using a lookup table, so that each of said integer values is mapped to a length number for that bitmap and each of said integer values is mapped to a description for that bitmap of whether that bitmap is last or not last in its sequence of bitmaps.

8. The method of claims 1, 2, 3, 4, 5, 6 or 7 wherein said size of an allocated contiguous section of memory is fetched as part of a method to fetch the sibling address of the next higher sibling address among sibling sections of memory stored within a data tree, said method to fetch a sibling address employing bitmaps each containing information describing whether that bitmap is part of a sequence of bitmaps of the higher or the lower boundary of a section of allocated memory, in addition to the information describing whether that bitmap is last or not last in its sequence of bitmaps, and in addition to the information describing its length number, said method to fetch the address of a next higher sibling section comprising the steps of:

(a) starting with a current address pointing to a bitmap adjacent to the lowest boundary of the current section of allocated memory allocated, proceeding to step b, (b) fetching the size of the current section of memory, using said size as an offset to said current address to calculate the address of the highest boundary of the current section of memory, proceeding to step c, (c) setting said current address to point to a bitmap adjacent to and higher than the highest boundary of the current section of memory, proceeding to step d, (d) reading said bitmap to see if it is part of a sequence of bitmaps of the higher or lower boundary of an allocated section of memory, proceeding to step e, (e) if said bitmap is part of a sequence of bitmaps of the higher boundary, proceeding to step f, otherwise returning said current address as the address of the lower boundary of the next higher sibling branch, (f) returning information to indicate that there is no higher sibling branch.

9. The method of claim 8 wherein supplemental information descriptive of a sequence of sibling sections within said data tree is stored in a supplemental section on the highest end of said sequence of sibling sections, so that in operations to fetch the next higher sibling said supplemental section must not be considered as a sibling, but rather skipped over unless said supplemental information is specifically to be retrieved.

10. The method of claim 8 or 9 wherein in step f, information to indicate that there is no higher sibling branch is returned along with said address of said higher boundary of memory found by step e.

11. The method of claim 10 wherein the sibling address of a next lower sibling section within a stored tree is fetched as part of a method to fetch the address of an enclosing section of memory representing a parent node within a stored data tree, said method employing a lowest bound address number describing the lowest address of data stored in said stored tree, said method to acquire the address of an enclosing section of memory comprising the steps of:

(a) starting with a current address pointing to a bitmap adjacent to the lowest boundary of the current section of memory allocated, proceeding to step b, (b) fetching the next lower sibling until no more siblings are found, so that said current address is set to point to a bitmap lower than and adjacent to the lowest sibling section of memory, proceeding to step c, (c) comparing said current address to said lowest bound address, and if said current address is lower, proceeding to step f, otherwise proceeding to step d, (d) reading the bitmap pointed to by said current address to see if it is part of a sequence of bitmaps of the higher or lower boundary of an allocated section of memory, and if it is of the lower boundary of an allocated section of memory, proceeding to step g, otherwise proceeding to step e, (e) setting said current address to point to the next lower adjacent bitmap in memory, proceeding to step c, (f) returning information to indicate that there is no enclosing section of memory, (g) setting said current address to point to the next higher adjacent bitmap in memory, then returning said current address as the address of the lower boundary of the enclosing section of memory.

12. The method of claims 1, 2, 3, 4, 5, 6 or 7 wherein said size of an allocated contiguous section of memory is fetched as part of a method to fetch the sibling address of the next lower sibling address among sibling sections of memory stored within a data tree, said method to fetch a sibling address employing bitmaps each containing information describing whether that bitmap is part of a sequence of bitmaps of the higher or the lower boundary of a section of allocated memory, in addition to the information describing whether that bitmap is last or not last in its sequence of bitmaps, and in addition to the information describing its length number, said method to fetch the address of a next lower sibling section comprising the steps of:

(a) starting with a current address pointing to a bitmap adjacent to the highest boundary of the current section of allocated memory allocated, proceeding to step b, (b) fetching the size of the current section of memory, using said size as an offset to said current address to calculate the address of the lowest boundary of the current section of memory, proceeding to step c, (c) setting said current address to point to a bitmap adjacent to and lower than the lowest boundary of the current section of memory, proceeding to step d, (d) reading said bitmap to see if it is part of a sequence of bitmaps on the higher or lower boundary of an allocated section of memory, proceeding to step e, (e) if said bitmap is part of a sequence of bitmaps of the lower boundary, proceeding to step f, otherwise returning said current address as the address of the higher boundary of the next lower sibling branch, (f) returning information to indicate that there is no lower sibling branch.

13. The method of claim 12 wherein supplemental information descriptive of a sequence of sibling sections within said data tree is stored in a supplemental section on the lowest end of said sequence of sibling sections, so that in operations to fetch the next lower sibling said supplemental section must not be considered as a sibling, but rather skipped over unless the supplemental information is specifically to be retrieved.

14. The method of claim 12 or 13 wherein in step f, information to indicate that there is no lower sibling branch is returned along with said address of said lower boundary of memory found by step e.

15. The method of claims 8, 4, 5, 12, 13 or 14 wherein a set of integer values stored in said bitmaps is mapped using a lookup table, so that each of said integer values is mapped to a description for that bitmap of whether that bitmap is part of a sequence of bitmaps of the higher or of the lower boundary of a section of allocated memory.

16. The method of claim 14 wherein the sibling address of a next higher sibling section within a stored tree is fetched as part of a method to fetch the address of an enclosing section of memory representing a parent node within a stored data tree, said method employing a highest bound address number describing the highest address of data stored in said stored tree, said method to acquire the address of an enclosing section of memory comprising the steps of:

(a) starting with a current address pointing to a bitmap adjacent to the lowest boundary of the current section of memory allocated, proceeding to step b, (b) fetching the next higher sibling until no more siblings are found, so that said current address is set to point to a bitmap higher than and adjacent to the highest sibling section of memory, proceeding to step c, (c) comparing said current address to said highest bound address, and if said current address is higher, proceeding to step f, otherwise proceeding to step d, (d) reading the bitmap pointed to by said current address to see if it is part of a sequence of bitmaps of the higher or lower boundary of an allocated section of memory, and if it is of the lower boundary of an allocated section of memory, proceeding to step g, otherwise proceeding to step e, (e) setting said current address to point to the next higher adjacent bitmap in memory, proceeding to step c, (f) returning information to indicate that there is no enclosing section of memory, (g) setting said current address to point to the next lower adjacent bitmap in memory, then returning said current address as the address of the higher boundary of the enclosing section of memory.

17. The method of claims 9 or 13 wherein said supplemental section is used to store supplemental reserve memory, so that memory can be allocated locally by moving memory from said supplemental reserve memory to sibling level sections, and so that memory can be de-allocated locally by moving memory from said sibling level sections to said supplemental reserve memory.

18. The method of claims 1, 2, 3, 4, 5, 6, 7, 8, 9, 10, 12, 13, 14, 15, 16 or 17 wherein bitmaps said to be adjacent to each other are positioned close together but not contiguously next to each other, or where bitmaps said to be adjacent to allocated sections of memory are positioned close to but not contiguously next to such allocated sections of memory, so that bitmaps can have memory addresses consistent with memory allocation boundaries or consistent with memory allocation offsets required by the data processing system in which they reside.

* * * * *